(12) United States Patent
Inayoshi et al.

(10) Patent No.: US 8,584,534 B2
(45) Date of Patent: Nov. 19, 2013

(54) SEAT APPARATUS FOR VEHICLE

(75) Inventors: Muneto Inayoshi, Nagoya (JP);
Hiroyuki Fujii, Kariya (JP); Yoshiaki Tomatsu, Anjo (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 307 days.

(21) Appl. No.: 13/071,675

(22) Filed: Mar. 25, 2011

(65) Prior Publication Data

US 2012/0068511 A1      Mar. 22, 2012

(30) Foreign Application Priority Data

Sep. 22, 2010  (JP) ................................. 2010-212550

(51) Int. Cl.
*G01L 1/26* (2006.01)
*G01L 1/00* (2006.01)
*G01B 7/16* (2006.01)
*G01G 19/08* (2006.01)
*G01G 19/52* (2006.01)

(52) U.S. Cl.
USPC .................. 73/862.391; 73/862.474; 73/781; 177/136; 177/144; 180/41

(58) Field of Classification Search
USPC ............. 73/862.391, 862.474, 781; 177/144, 177/136
See application file for complete search history.

(56) References Cited

U.S. PATENT DOCUMENTS

| | | | |
|---|---|---|---|
| 6,069,325 A * | 5/2000 | Aoki ............................. | 177/136 |
| 6,397,688 B1 * | 6/2002 | Sakamoto et al. ....... | 73/862.637 |
| 6,786,104 B1 | 9/2004 | Aoki | |
| 6,840,119 B2 | 1/2005 | Aoki | |
| 7,513,571 B2 * | 4/2009 | Hofmann et al. ........ | 297/344.15 |
| 7,762,150 B2 * | 7/2010 | Kawabata et al. ....... | 73/862.474 |
| 7,963,605 B2 * | 6/2011 | Ramaseshadri et al. . | 297/344.15 |
| 8,212,157 B2 * | 7/2012 | Ito et al. ........................ | 177/136 |
| 8,384,530 B2 * | 2/2013 | Inayoshi et al. ........... | 340/425.5 |
| 2003/0110869 A1 * | 6/2003 | Aoki ......................... | 73/862.391 |
| 2004/0201264 A1 * | 10/2004 | Hofmann et al. .......... | 297/344.1 |
| 2005/0046256 A1 * | 3/2005 | Yamada ..................... | 297/344.1 |
| 2005/0284668 A1 * | 12/2005 | Hida et al. ................... | 177/136 |
| 2006/0170259 A1 * | 8/2006 | Inayoshi et al. ........... | 297/217.3 |
| 2007/0209451 A1 * | 9/2007 | Kajiyama et al. ........ | 73/862.627 |
| 2009/0051198 A1 * | 2/2009 | Ishikawa et al. ........... | 297/217.2 |
| 2010/0001871 A1 * | 1/2010 | Mori et al. ..................... | 340/650 |
| 2011/0010037 A1 * | 1/2011 | Inayoshi et al. ................ | 701/29 |

FOREIGN PATENT DOCUMENTS

| | | | |
|---|---|---|---|
| JP | 2001-150997 A | | 6/2001 |
| JP | 2008-032479 A | | 2/2008 |
| JP | 2011105299 A | * | 6/2011 |

* cited by examiner

*Primary Examiner* — Lisa Caputo
*Assistant Examiner* — Jamel Williams
(74) *Attorney, Agent, or Firm* — Buchanan Ingersoll & Rooney PC (57) ABSTRACT

A seat apparatus for a vehicle includes a slide rail arranged slidably relative to a vehicle floor in a longitudinal direction, a bracket including a first end portion fixed to the slide rail, a second end portion, and a connecting portion connecting the first end portion to the second end portion, a vehicle seat supported by the bracket, and a load detection device arranged between the slide rail and the second end portion of the bracket and detecting a load applied to the vehicle seat, wherein rigidity of the connecting portion of the bracket in a vertical direction of the vehicle is set to be lower than rigidities of the first end portion and the second end portion of the bracket in the vertical direction.

17 Claims, 5 Drawing Sheets

SEAT APPARATUS FOR VEHICLE

CROSS REFERENCE TO RELATED APPLICATIONS

This application is based on and claims priority under 35 U.S.C. §119 to Japanese Patent Application 2010-212550, filed on Sep. 22, 2010, the entire content of which is incorporated herein by reference.

TECHNICAL FIELD

This disclosure relates to a seat apparatus for a vehicle, which includes a load detection device detecting a load applied to a vehicle seat.

BACKGROUND DISCUSSION

A known seat apparatus for a vehicle includes a seat adjustment device adjusting a position of a vehicle seat on which an occupant sits, and a load detection device detecting a load applied to the vehicle seat. A detection result by the load detection device is utilized in a control device for determining whether or not an occupant safety protection device is driven or whether or not the occupant is seated on the vehicle seat. The seat apparatus configured as described above is disclosed, for example, in JP2008-32479A (hereinafter referred to as Reference 1) or JP2001-150997A (hereinafter referred to as Reference 2, refer to a fourth embodiment and FIG. 4). The seat apparatus according to Reference 1 includes a pair of slide rails (upper rails) arranged in a lateral direction of the vehicle and sliding along a longitudinal direction of the vehicle, and load detection devices arranged between each of the slide rails and each of a pair of brackets arranged at respective upper sides of the slide rails along the longitudinal direction to support the vehicle seat. In particular, according to the seat apparatus described in Reference 1, the load detection devices are arranged at four portions that are attachment portions located at respective front and rear end portions of the slide rails arranged in the lateral direction of the vehicle.

According to the seat apparatus according to Reference 2, the number of load detection devices is lower than the number of load detection devices applied in the seat apparatus according to Reference 1 in order to reduce manufacturing, assembling, and wiring costs. The load detection devices are arranged at two portions that are respective attachment portions located between each of rear end portions of a pair of slide rails and each of a pair of brackets in the lateral direction. The bracket and a front end portion of the slide rail are fixed to each other by spot welding and the like.

The magnitude or direction of the load applied to the vehicle seat vary depending on an orientation of the vehicle, an orientation of the occupant, a seated position of the occupant on the vehicle seat, and the like. Accordingly, a load acts on each of the load detection devices in a direction different from a load detecting direction; therefore errors may be included in a detection value of the load detection device. According to the seat apparatus described in Reference 1, the vehicle seat and the slide rails are fixed to one another by the brackets. In addition, each of the brackets is configured to connect the fixed portion positioned at front side of the slide rail to the fixed portion at a rear side of the slide rail. Accordingly, when the magnitude or direction of the load applied to the vehicle seat varies, only a vertical component of force of the applied load relative to a vehicle floor acts on the load detection device. As a result, the errors in the detection value may be reduced.

In addition, for example, the slide rail or a frame that constitutes a portion of the vehicle seat may be deformed depending on the variations of the magnitude or direction of the applied load or depending on an adjusted position of the vehicle seat. At this time, a load acting in a direction to detach the bracket from the slide rail or in a direction to press the bracket against the slide rail may be applied to the fixed portion of the front or rear side of the vehicle seat (slide rail). The load due to the deformation of the slide rail or the frame may be transmitted to the load detection device by the bracket and therefore acts on the load detection device.

Here, in the seat apparatus described in Reference 1, the load applied to the vehicle seat is detected based on a sum total of detection values of the load detection devices arranged at the aforementioned four portions. Accordingly, even when the load due to the deformation of the slide rail or the frame is applied to the fixed portion of the front or rear side of the vehicle seat, variations of the loads acting on the load detection devices are compensated for one another, therefore minimizing influences of the variations on a detection result by the load detection devices. Meanwhile, in the seat apparatus described in Reference 2, the load detection devices are arranged only at the aforementioned two portions. Accordingly, variations of loads acting on the respective load detection devices due to the deformation of the slide rail or the frame may not be compensated for one another. Consequently, errors may be included in the sum total of the detection values of the load detection devices.

A need thus exists for a seat apparatus for a vehicle, which is not susceptible to the drawback mentioned above.

SUMMARY

According to an aspect of this disclosure, a seat apparatus for a vehicle includes a slide rail arranged slidably relative to a vehicle floor in a longitudinal direction, a bracket including a first end portion fixed to the slide rail, a second end portion, and a connecting portion connecting the first end portion to the second end portion, a vehicle seat supported by the bracket, and a load detection device arranged between the slide rail and the second end portion of the bracket and detecting a load applied to the vehicle seat, wherein rigidity of the connecting portion of the bracket in a vertical direction of the vehicle is set to be lower than rigidities of the first end portion and the second end portion of the bracket in the vertical direction.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

A seat apparatus according to an embodiment of this disclosure will be described with reference to illustrations of the drawing figures as follows. Hereinafter, a direction of an occupant seated at a seat apparatus 1 according to the embodiment will be defined as a front side of the vehicle for ease of explanation, that is, a longitudinal direction (the front side and a rear side), a lateral direction (right and left sides), and a vertical direction (upper and lower sides) of the seat apparatus 1 correspond to those of the vehicle.

Figure 1:
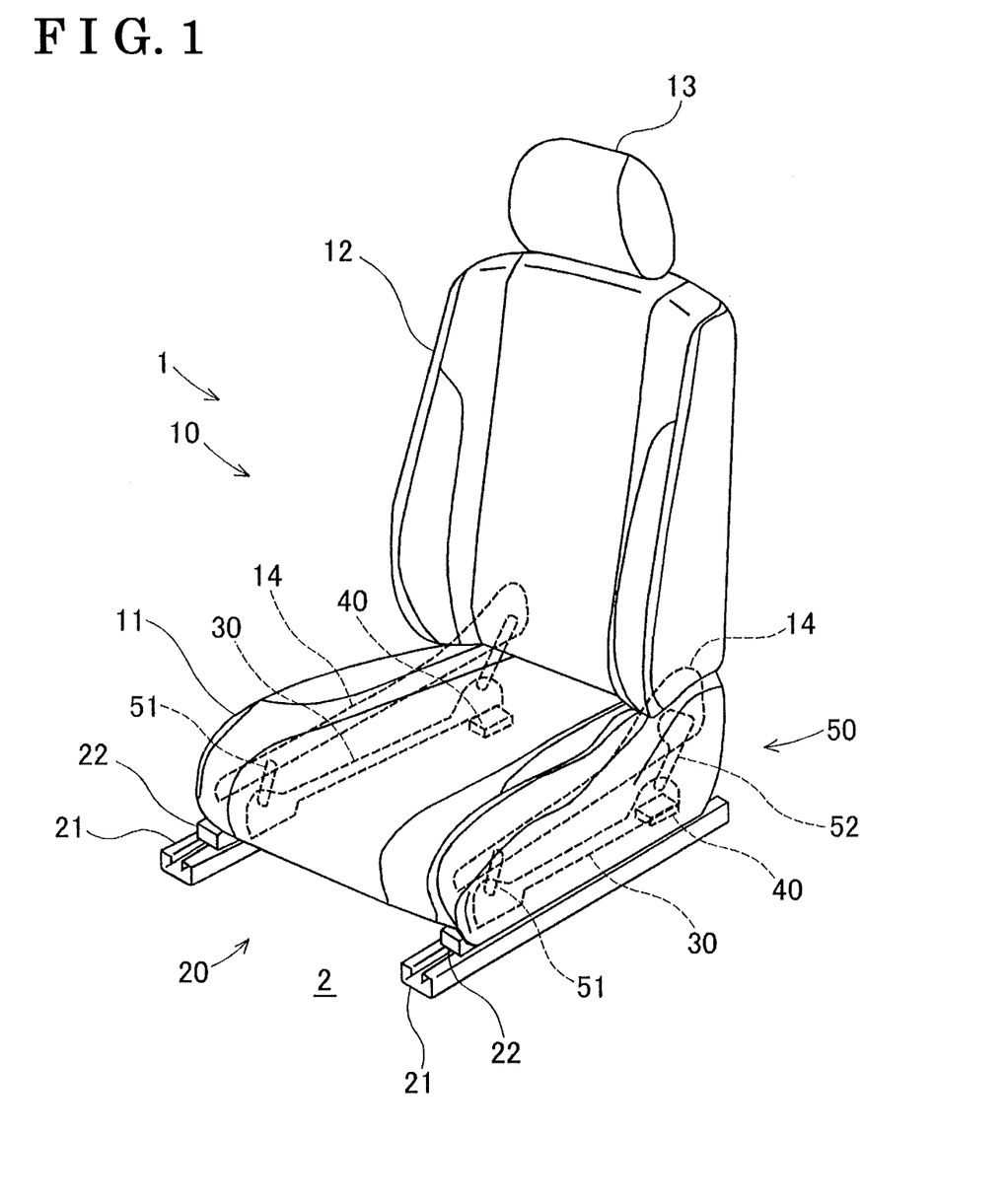
FIG. 1 is a perspective view of a whole seat apparatus for a vehicle, according to an embodiment disclosed here.
Figure 2:
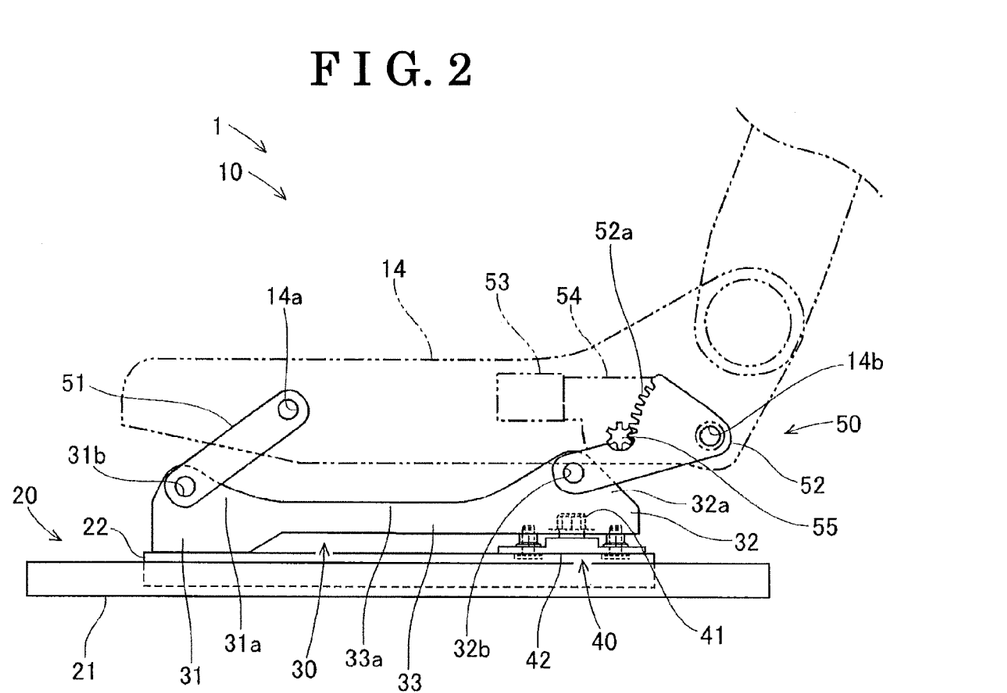
FIG. 2 is a side view illustrating a main portion of the seat apparatus according to the embodiment disclosed here.

(Configuration of the seat apparatus) As illustrated in FIGS. 1 and 2, the seat apparatus 1 mainly includes a vehicle seat 10, a slide mechanism 20, a pair of brackets 30, load detection devices 40, and a lift mechanism 50. A vehicle floor 2 to which the seat apparatus 1 is fixed serves as a floor of the vehicle (the vehicle floor 2 will be hereinafter referred to as a floor 2).

The vehicle seat 10 mounted on the vehicle serves as a seat for the occupant (the vehicle seat 10 will be hereinafter referred to as a seat 10). As illustrated in FIG. 1, the seat 10 mainly includes a seat cushion 11, a seat back 12, a head rest 13, and seat frames 14. The seat cushion 11 serves as a seating portion on which the occupant sits. The seat back 12 corresponds to a back rest attached to a rear end portion of the seat cushion 11 and tiltable in the longitudinal direction. The head rest 13 is arranged at an upper end of the seat back 12 while supporting the head of the occupant. The seat frames 14 are arranged at a lower side of the seat cushion 11 at predetermined intervals from each other in the lateral direction. The seat 10 is fixedly supported relative to the brackets 30 by the seat frames 14 in a condition where the lift mechanism 50 that will be described below is arranged between the brackets 30 and the seat 10 in the vertical direction. First and second attachment bores 14a and 14b are formed in each of the seat frames 14. First and second links 51 and 52 of the lift mechanism 50 are connected to the first attachment bore 14a and the second attachment bore 14b, respectively.

The slide mechanism 20 serves as a base supporting the seat 10 relative to the floor 2 and adjusting a position of the seat 10 in the longitudinal direction. As illustrated in FIG. 1, the slide mechanism 20 mainly includes a pair of lower rails 21 and a pair of upper rails 22 (slide rails). The lower rails 21 extending in the longitudinal direction are positioned at a lower side of the slide mechanism 20. The lower rails 21 are fixed to the floor 2 by fixing members so as to keep a predetermined distance from each other in the lateral direction.

The upper rails 22 extending in the longitudinal direction are positioned at an upper side of the slide mechanism 20. The pair of upper rails 22 attached to the pair of lower rails 21 is arranged slidably relative to the floor 2 along the longitudinal direction. In addition, a relative slide movement between the lower rails 21 and the upper rails 22 is switchable between locked and unlocked states by a lock/unlock mechanism. Thus, the slide mechanism 20 may fix the upper rails 22 relative to the floor 2 so that the upper rails 22 are positioned desirably or selectively by the occupant; therefore, the position of the seat 10 supported by the upper rails 22 is adjustable in the longitudinal direction.

Figure 3:
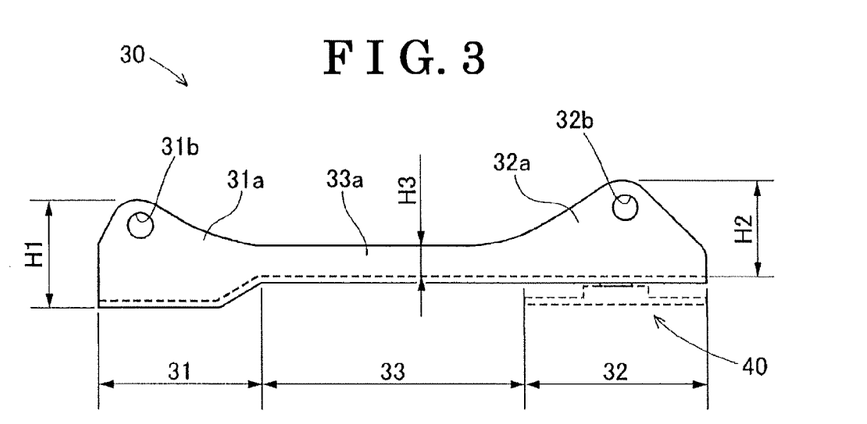
FIG. 3 is a front view of a bracket of the seat apparatus according to the embodiment disclosed here.
Figure 4:
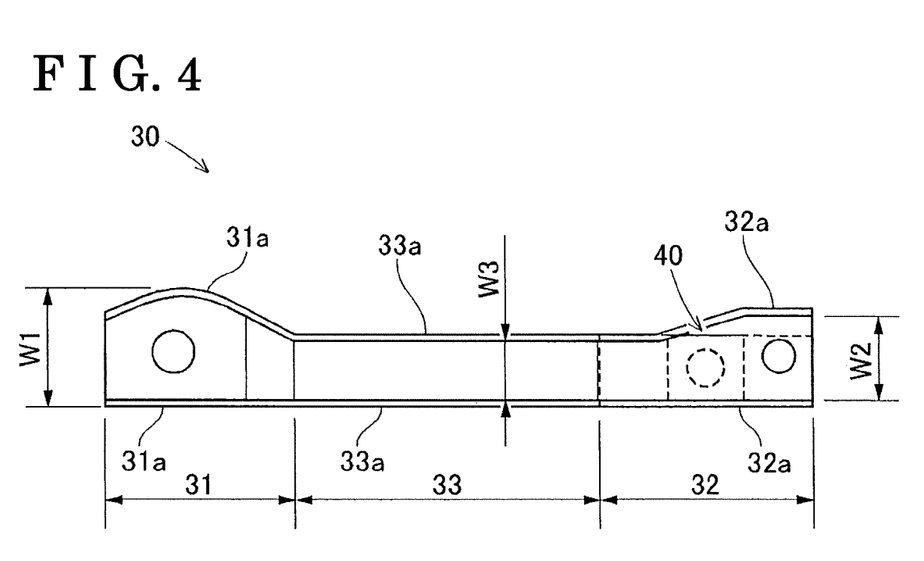
FIG. 4 is an upper view of the bracket of the seat apparatus according to the embodiment disclosed here.

The brackets 30 support the seat 10 in a condition where the lift mechanism 50 is arranged between the brackets 30 and the seat 10 in the vertical direction. The pair of brackets 30 is fixed to respective front end portions of the pair of upper rails 2. Further, the pair of brackets 30 is supported by respective rear end portions of the pair of upper rails 22 in a condition where each of the load detection devices 40 is sandwiched between each of the brackets 30 and each of the upper rails 22 in the vertical direction. In particular, the seat 10 is fixed or supported by attachment portions located at the front and rear end portions of each of the upper rails 2. As illustrated in FIGS. 2 to 4, the bracket 30 includes a front end portion 31, a rear end portion 32, and a connecting portion 33.

The front end portion 31 includes a flat surface portion contacting a ceiling plate of the upper rail 22. The flat surface portion of the front end portion 31 is directly fixed to the upper rail 22 by a fixing member such as a bolt. The front end portion 31 serves as a first end portion. The rear end portion 32 includes a flat surface portion having a length in the longitudinal direction, which is the same size as a length of the load detection device 40 in the longitudinal direction. The flat surface portion of the rear end portion 32 is indirectly supported by the upper rail 22 in a condition where the load detection device 40 is sandwiched between the upper rail 22 and the bracket 30. The rear end portion 32 serves as a second end portion positioned rearward relative to the first end portion in the longitudinal direction. The connecting portion 33 includes a flat surface portion extending between the front end portion 31 and the rear end portion 32. The flat surface portion of the connecting portion 33 connects the front end portion 31 to the rear end portion 32 to connect the attachment portion of the front portion of the upper rail 22 to the attachment portion of the rear end portion of the upper rail 22.

Further, first, second, and third flanges 31a, 32a, and 33a continuously formed with one another are arranged at a portion of a peripheral side edge of each of the brackets 30 in the lateral direction so as to extend upward along the longitudinal direction. As illustrated in FIG. 3, a first attachment bore 31b to which the first link 51 of the lift mechanism 50 is attached is formed in the first flange 31a while a second attachment bore 32b to which the second link 52 of the lift mechanism 50 is attached is formed in the second flange 32a. Moreover, as shown in FIG. 4, the first, second, and third flanges 31a, 32a, and 33a are formed in a uniform thickness (see FIG. 4). One of side surfaces of the bracket 30 in the lateral direction is a flat surface. As described above, the pair of brackets 30 supports the seat 10 in a condition where the lift mechanism 50 is sandwiched between the brackets 30 and the seat 10 in the vertical direction and each of the brackets 30 is fixed or supported by the attachment portions of the front and rear end portions of the upper rail 22. In addition, as described above, the first, second, and third flanges 31a, 32a, and 33a of the bracket 30 are formed at the peripheral side edge so as to extend upward along the longitudinal direction. Alternatively, the first, second, and third flanges 31a, 32a, and 33a of the bracket 30 may be formed at the peripheral side edge so as to extend downward along the longitudinal direction.

In addition, flexural rigidity of the connecting portion 33 of the bracket 30 in the vertical direction is set to be lower than flexural rigidities of the front end portion 31 and the rear end portion 32 in the vertical direction. The flexural rigidities of the front end portion 31, the rear end portion 32, and the connecting portion 33 are set as described above in order to improve detection accuracy of the load detection device 40 for a load applied to the seat 10. The load detection device 40 will be described in further detail below.

The load detection device 40 is a load detection means arranged between the upper rail 22 and the rear end portion 32 of the bracket 30 and detecting the load applied to the seat 10.

In particular, the load detection devices 40 are arranged at two portions that are located at the respective rear end portions of the pair of upper rails 22. The load detection devices 40 support the brackets 30 relative to the upper rails 22, respectively. That is, the load detection devices 40 are attached to the respective rear end portions of the upper rails 22 and to the respective rear end portions 32 of the brackets 30. In other words, the seat 10 is supported by the brackets 30 in a condition where the lift mechanism 50 is arranged between the seat 10 and the brackets 30 in the vertical direction. In addition, the seat 10 is arranged so that two corners at respective rear ends of lower surfaces of the seat frames 14 are supported by the upper rails 22.

The load detection device 40 mainly includes a load input portion 41 and a base portion 42. The load input portion 41 makes contact with the rear end portion 32 of the bracket 30 to receive the load applied to the seat 10 via the bracket 30; therefore, the load is inputted to the load detection device 40. Thus, the load detection device 40 detects the load in accordance with an amount of deformation of an flexure element made of metal. In particular, in a case where the load detection device 40 utilizes a strain gauge having an electric resistance varying depending on an amount of deformation of a metallic member included in the strain gauge and a load is applied to the metallic member, the load detection device 40 outputs a signal for detecting the amount of deformation of the metallic member. The load detection device 40 is configured to detect the minute deformation of the metallic member serving as the flexure element where an internal stress is generated by the applied load. The base portion 42 includes, for example, through holes; thereby, the load detection device 40 is fixed to the upper rail 22 by fixing members such as bolts inserted in the through holes. According to the embodiment, two bolts inserted in the through holes and penetrating through the ceiling plate of the upper rail 22 and the base portion 42, are tightened with two nuts arranged at an upper side of the base portion 42, thereby fixing the load detection device 40 to the upper rail 22.

The lift mechanism 50 is arranged between the seat 10 and the brackets 30 in the vertical direction. The lift mechanism 50 moves the seat 10 upward and downward relative to the floor 2. The lift mechanism 50 mainly includes the first links 50, the second links 52, a motor 53, a speed reduction device 54, and a pinion gear 55. Each of the first links 51 is rotatably connected to the first attachment bore 14a formed in the seat frame 14 and to the first attachment bore 31b formed in the first flange 31a of the bracket 30. Each of the second links 52 is rotatably connected to the second attachment bore 14b formed in the seat frame 14 and to the second attachment bore 32b of the second flange 32a of the bracket 30. A sector gear 52a having external teeth formed in an outer circular arc is formed at the sector link 52. The external teeth of the sector gear 52a engage with the pinion gear 55.

The motor 53 is arranged at a lower side of the seat frame 14. The motor 53 serves as an electric motor rotating in normal and reverse directions in accordance with the volume of power supplied to the electric motor. The speed reduction device 54 connected to an output shaft of the motor 53 reduces the number of rotations of the motor 53. The speed reduction device 54 transmits a driving force of the motor 53 to the pinion gear 55 by means of a worm gear. The worm gear of the speed reduction device 54 includes a self lock function by which torque inputted from the pinion gear 55 is not transmitted to the motor 53. Accordingly, only when the driving force of the motor 53 is transmitted to the speed reduction device 54, the pinion gear 55 rotates. The pinion gear 55 is fixed to an end portion of a rotation shaft of the speed reduction device 54. The pinion gear 55 engages with the sector gear 52a of the second link 52.

The lift mechanism 50 configured as described above moves the seat 10 upward and downward relative to the floor 2 while the rotation of the motor 53 is controlled by the speed reduction device 54. In particular, the motor 53 rotates and a rotation speed of the motor 53, which is reduced by the speed reduction device 54, is transmitted to the pinion gear 55. Then, the driving force of the motor 53 is transmitted to the sector gear 52a engaging with the pinion gear 55. Accordingly, the first link 51 and the second link 52 rotate relative to the seat frame 14 and the bracket 30. Here, the second links 52 connected via the second attachment bores 32b to the pair of brackets 30 fixed at right and left sides of the upper rails 22 in the lateral direction are connected to the seat frames 14 by a rotating force transmitting member that penetrates through the second attachment bores 14b of the seat frames 14 in the lateral direction. Consequently, one of the second links 52 at the right and left sides of the upper rails 22 rotates and the rotating force is transmitted to the other of the second links 52 by the rotating force transmitting member. Then, the other of the second links 52 is rotated along with the one of the second links 52. As a result, as illustrated in FIGS. 5A and 5B, the seat 10 is moved upward and downward in accordance with an operation of the lift mechanism 50.

(Configuration of the bracket) As described above, the connecting portion 33 connects the front end portion 31 to the rear end portion 32, thereby connecting the attachment portions of the front and rear end portions of the upper rail 22 to each other in order to improve the detection accuracy of the load detection device 40 arranged between the rear end portion 32 of the bracket 30 and the upper rail 22 in the vertical direction. In the seat apparatus 1, the load detection devices 40 are arranged only at the respective rear end portions of the upper rails 22 in the lateral direction. Such arrangement of the load detection devices 40 may be inferior in the detection accuracy to a case where the load detection devices 40 are arranged at the respective front and rear end portions of the upper rails 22 in the lateral direction.

In particular, when the seat 10 is moved upward and downward by the operation of the lift mechanism 50, connecting angles of the first link 51 and the second link 52 of the lift mechanism 50 relative to the bracket 30 vary. For example, when the seat cushion 11 is in a lowest position as illustrated in FIG. 5A, an angle Lα formed by the first link 51 attached to the first attachment bore 31b is defined as the connecting angle Lα of the first link 51 relative to the bracket 30 and an angle Lβ formed by the second link 52 attached to the second attachment bore 32b and the horizontal surface is defined as the connecting angle Lβ of the second link 52 relative to the bracket 30. Further, when the seat cushion 11 is in a highest position as illustrated in FIG. 5B, an angle Hα formed by the first link 51 attached to the first attachment bore 31b and a horizontal surface is defined as the connecting angle Hα of the first link 51 relative to the bracket 30 and an angle Hβ formed by the second link 52 attached to the second attachment bore 32b and the horizontal surface is defined as the connecting angle Hβ of the second link 52 relative to the bracket 30. The connecting angle Hα of the first link 51 relative to the bracket 30 is larger than the connecting angle Lα of the first link 51 relative to the bracket 30 (Lα<Hα). Meanwhile, the connecting angle Hβ of the second link 52 relative to the bracket 30 is larger than the connecting angle Lβ of the second link 52 relative to the bracket 30 (Lβ<Hβ).

Figure 5A:
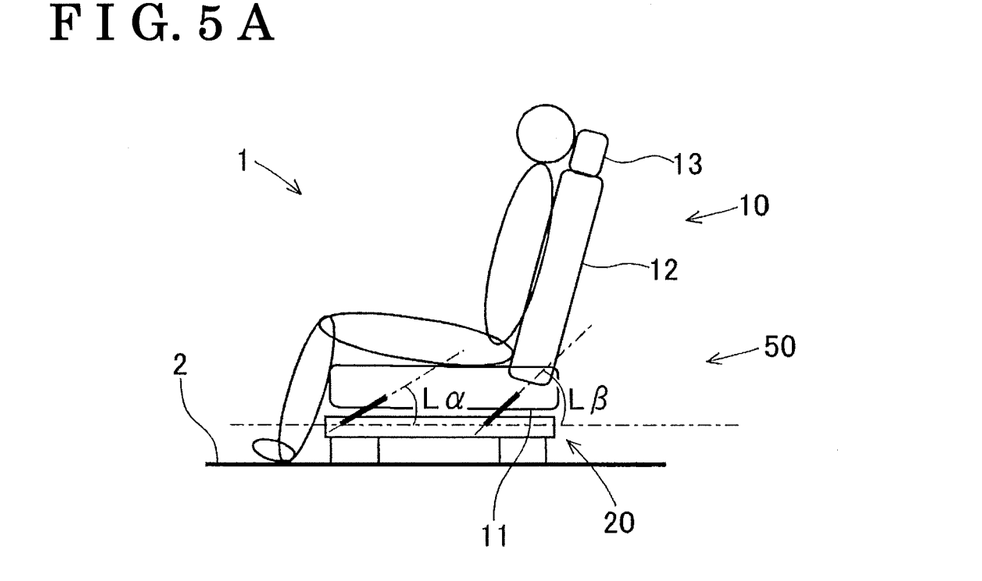
FIG. 5A is an explanation drawing that describes a load shift of a vehicle seat moved by an operation of a lift mechanism and that briefly illustrates a condition where a seat cushion of the vehicle seat is in a lowest position.
Figure 5B:
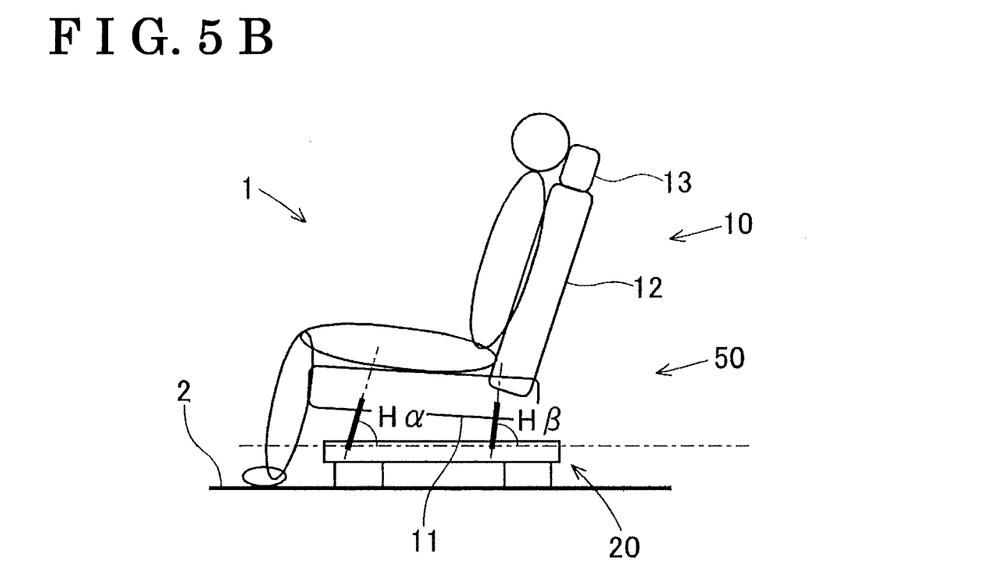
FIG. 5B is an explanation drawing that describes the load shift of the vehicle seat moved by the operation of the lift mechanism and that briefly illustrates a condition where the seat cushion is in a highest position.

In other words, when the seat cushion 11 of the seat 10 is in the lowest position shown in FIG. 5A and the highest position shown FIG. 5B, directions in which the first attachment bore 31b and the second attachment bore 32b receive the load of the seat 10 (including a load of the occupant) from the first link 51 and the second link 52, respectively, are different from one another. As described above, the bracket 30 includes the connecting portion 33 connecting the front end portion 31 that is fixed to the upper rail 22, to the rear end portion 32 that supports the load detection device 40 in a condition where the load detection device 40 is arranged between the bracket 30 and the upper rail 22. Accordingly, a vertical component of force of the load of the seat 10 is appropriately inputted to the load detection device 40. Consequently, even when the directions in which the bracket 30 receives the load of the seat 10 vary in accordance with the operation of the lift mechanism 50, the load detection devices 40 arranged at the respective rear end portions of the upper rails 22 in the lateral direction may surely detect the load of the occupant seated on the seat 10.

According to the seat apparatus 1 of the embodiment, the seat frame 14 or the upper rail 22 may be deformed depending on variations of the magnitude or direction of the load applied to the seat 10 and depending on an adjusted position of the seat 10 by the slide mechanism 20. Accordingly, a load due to the deformation of the seat frame 14 or the upper rail 22 may be applied to the bracket 30 connecting the attachment portions of the front and rear end portions of the upper rail 22 to each other because a stress generated within the bracket 30 due to different deformation patterns of the seat frame 14 and the upper rail 22 is transmitted to the load detection device 40 via the connecting portion 33 of the bracket 30. Thus, the load due to the deformation of the seat frame 14 to which the bracket 30 is fixed or the upper rail 22 to which the bracket 30 is fixed causes deterioration of the detection accuracy of the load detection device 40.

As described above, according to the seat apparatus 1 of the embodiment, the bracket 30 is configured so that the flexural rigidity of the connecting portion 33 in the vertical direction is lower than the flexural rigidities of the front end portion 31 and the rear end portion 32 in the vertical direction. The load due to the deformation of the seat frame 14 or the upper rail 22 acts in a direction to detach the bracket 30 from the upper rail 22 or in a direction to press the bracket 30 against the upper rail 22, i.e., the load due to the deformation of the seat frame 14 or the upper rail 22 acts in the vertical direction. Accordingly, when the seat frame 14 or the upper rail 22 is deformed, the bracket 30 may be deformed so as to allow the deformation of the seat frame 14 or the upper rail 22. In particular, even when the deformation patterns of the seat frame 14 and the upper rail 22 that support therebetween the bracket 30 are different from each other, the connecting portion 33 is deformed so as to allow a difference between an amount of deformation of the seat frame 14 and an amount of deformation of the upper rail 22. Consequently, the load due to the deformation of the seat frame 14 or the upper rail 22 is refrained from acting on the load detection device 40.

In addition, the front end portion 31 serving as the first end portion of the bracket 30 is fixed to the upper rail 22; therefore, the upper rail 22 may be deformed relative to the front end portion 31 of the bracket 30. Accordingly, in a case where the flexural rigidity is high at portions of the bracket 30, a stress generated within the bracket 30 due to the deformation of the upper rail 22 relative to the bracket 30 may act on the load detection device 40 via the rear end portion 32 serving as the second end portion of the bracket 30. Consequently, the bracket 30 is configured to include the connecting portion 33 elastically deformed when the upper rail 22 is deformed relative to the bracket 30; therefore, the load due to the deformation of the upper rail 22 relative to the bracket 30 is refrained from acting on the load detection device 40. Thus, the connecting portion 33 allows the deformation of the upper rail 22 relative to the bracket 30 to improve the detection accuracy of the load detection device 40.

According to the seat apparatus 1 of the embodiment, the bracket 30 is configured as follows in order that the flexural rigidity of the connecting portion 33 is lower than the flexural rigidities of the front end portion 31 and the rear end portion 32. Firstly, lengths of the first, second, and third flanges 31a, 32a, and 33a in the vertical direction are adjusted to thereby set the respective flexural rigidities. Here, the length of the first flange 31a of the front end portion 31 in the vertical direction, the length of the second flange 32a of the rear end portion 32 in the vertical direction, and the length of the third flange 33a of the connecting portion 33 in the vertical direction are defined as heights H1, H2, and H3, respectively. As illustrated in FIG. 3, the height H3 of the third flange 33a formed at the connecting portion 33 is set to be shorter than the heights H1 and H2 of the first flange 31a and the second flange 32a formed at the front end portion 31 and the rear end portion 32, respectively. The height H1 of the first flange 31a is set to be longer than the height H2 of the second flange 32a. The bracket 30 includes the first, second, and third flanges 31a, 32a, and 33a in order to structurally increase the flexural rigidity of the bracket 30 in the vertical direction. In other words, the height H3 of the third flange 33a of the connecting portion 33 is set to be small, thereby easily decreasing the flexural rigidity in the vertical direction.

Secondly, a width of a whole flat surface of the bracket 30 in the lateral direction is adjusted as follows to thereby set the flexural rigidity. Here, a width of a flat surface of the front end portion 31, a width of a flat surface of the rear end portion 32, and a width of a flat surface of the connecting portion 33 are defined as widths W1, W2, and W3 in the lateral direction. As illustrated in FIG. 4, the width W3 of the flat surface of the connecting portion 33 is set to be smaller than the width W1 of the flat surface of the front end portion 31 and the width W2 of the flat surface of the rear end portion 32. The width W1 of the flat surface of the front end portion 31 is set to be larger than the width W2 of the flat surface of the rear end portion 32. The width W1 of the front end portion 31 in the lateral direction is appropriately set so that the front end portion 31 may be directly fixed to the upper rail 22. Further, the width W2 of the rear end portion 32 in the lateral direction is appropriately set so that the load detection device 40 may be supported between the rear end portion 32 and the upper rail 22 in the vertical direction. Thus, the front end portion 31 and the rear end portion 32 of the bracket 30 have the flexural rigidities in the vertical direction which depend on the widths W1 and W2, respectively. In addition, the width W3 of the connecting portion 33 in the lateral direction is set to be relatively small, thereby easily decreasing the flexural rigidity in the vertical direction.

(Effects of the seat apparatus) The bracket 30 configured as described above includes the connecting portion 33 connecting the front end portion 31 to the rear end portion 32. Further, the flexural rigidity of the connecting portion 33 of the bracket 30 is set to be low. In the seat apparatus 1 configured as described above, when the upper rail 22 or the seat frame 14 that constitutes a portion of the seat 10 is deformed, the load due to the deformation may be applied to the attachment portion of the front or rear end portion of the upper rail 22 and the bracket 30 supporting the seat 10. Since the bracket 30 is configured as described above, the connecting portion 33 of the bracket 30 allows the deformation of the upper rail 22 or the like. Accordingly, the load due to the deformation of the upper rail 22 or the like is refrained from acting on the load detection device 40 arranged between the upper rail 22 and the rear end portion 32 of the bracket 30 in the vertical direction. As a result, even when the upper rail 22 or the like is deformed, the load due to the deformation is refrained from affecting a detection value of the load detection device 40 and the load detection device 40 may further accurately detect the load applied to the seat 10.

In addition, as described above, in a case where the upper rail 22 is deformed relative to the front end portion 31 of the bracket 30, the connecting portion 33 of the bracket 30 is elastically deformed. Accordingly, the load due to the deformation of the upper rail 22 relative to the bracket 30 is refrained from acting on the load detection device 40 arranged between the rear end portion 32 of the bracket and the upper rail 22 in the vertical direction. Consequently, the load detection device 40 may further accurately detect the load applied to the seat 10.

Moreover, according to the seat apparatus 1 of the embodiment, the bracket 30 is configured as follows. Firstly, the lengths of the first, second, and third flanges 31a, 32a, and 33a in the vertical direction are adjusted in order that the flexural rigidity of the connecting portion 33 is lower than the flexural rigidities of the front end portion 31 and the rear end portion 32. In other words, the height H3 of the third flange 33a formed at the connecting portion 33 is set to be lower than the heights H1 and H2 of the first flange 31a and the second flange 32a formed at the front end portion 31 and the rear end portion 32, respectively. Secondly, the width of the whole flat surface of the bracket 30 in the lateral direction is adjusted. In particular, the width W3 of the flat surface of the connecting portion 33 is set to be smaller than the width W1 of the flat surface of the front end portion 31 and the width W2 of the flat surface of the rear end portion 32. Thus, the bracket 30 is simply configured by the aforementioned adjustment of the heights and widths of the first, second, and third flanges 31a, 32a, and 33a; thereby, the flexural rigidity of the connecting portion 33 in the vertical direction may be set to be lower than the flexural rigidities of the front end portion 31 and the rear end portion 32.

According to the seat apparatus 1 of the embodiment, the lift mechanism 50 is arranged between the seat 10 and the brackets 30 in the vertical direction. In the seat apparatus 1, the seat 10 and the occupant seated on the seat 10 or baggage placed on the seat 10 are moved upward and downward by the lift mechanism 50; therefore, the magnitude or direction of the load applied to the seat 10 tends to vary. In particular, in a conventional seat apparatus, an amount of deformation of the upper rail 22 or the seat frame 14 that constitutes a portion of the seat 10 varies in accordance with the adjustment of the position of the seat 10 in the vertical direction by the lift mechanism 50 and the load applied to the load detection device 40 via the bracket 30 also varies.

As described above, the bracket 30 having the aforementioned configuration is applied to the seat apparatus 1 of the embodiment. Consequently, in a case where the upper rail 22 or the like is deformed by the adjustment of the position of the seat 10 in the vertical direction by the lift mechanism 50, the load due to the deformation of the upper rail 22 or the like is refrained from acting on the detection value of the load detection device 40. As a result, the load detection device 40 may further accurately detect the load applied to the seat 10. Thus, the bracket 30 in which the flexural rigidity of the connecting portion 33 is set to be low is applied to the seat apparatus 1 provided with the lift mechanism 50, therefore effectively improving the detection accuracy of the load detection device 40.

In addition, according to the seat apparatus 1 of the embodiment, the load detection devices 40 are arranged at the respective rear end portions of the pair of upper rails 22. Such arrangement of the load detection devices 40 may further reduce manufacturing, assembling, and wiring costs, compared to a case where the load detection devices 40 are arranged at the attachment portions of the respective front and rear end portions of the pair of upper rails 22. On the other hand, in a case where the load detection devices 40 are arranged at the respective rear end portions of the pair of upper rails 22, information detected by the load detection devices 40 may be less compared to a case where the load detection devices 40 are arranged at the attachment portions of the respective front and rear end portions of the pair of upper rails 22. In this case, errors included in a sum total of detection values of the load detection devices 40 due to the deformation of the upper rail 22 or the like are expected to be reduced. Furthermore, in a case where the occupant is seated on the seat 10, the center of gravity of the occupant is positioned further rearward than an intermediate position of the seat 10 in the longitudinal direction. Accordingly, the load of the seat 10 including the load of the occupant is mainly applied to the rear end portion 32 of the bracket 30 supporting the seat 10. That is, the load acting in the direction to detach the bracket 30 from the upper rail 22 is applied to the front end portion 31 of the bracket 30 and the load acting in the direction to press the bracket 30 against the upper rail 22 is applied to the rear end portion of the bracket 30.

Accordingly, the bracket 30 configured as described above is applied to the seat apparatus 1 and the load detection device 40 is arranged between the upper rail 22 and the rear end portion 32 of the bracket 30; thereby, the load due to the deformation of the upper rail 22 or the like is refrained from acting on the load detection device 40. Consequently, even when the upper rail 22 or the like is deformed, the deformation is refrained from affecting the detection value of the load detection device 40 and the load detection device 40 may further accurately detect the load applied to the seat 10.

According to the seat apparatus 1 of the embodiment, the heights H1, H2, and H3 and the width W1, W2, and W3 of the first, second, and third flanges 31a, 32a, and 33a of the bracket 30 are adjusted in order that the flexural rigidity of the connecting portion 33 is lower than the flexural rigidities of the front end portion 31 and the rear end portion 32. Alternatively, the bracket 30 may be configured in a different manner from the configuration according to the embodiment as long as the connecting portion 33 may be set to be low.

Figure 6:
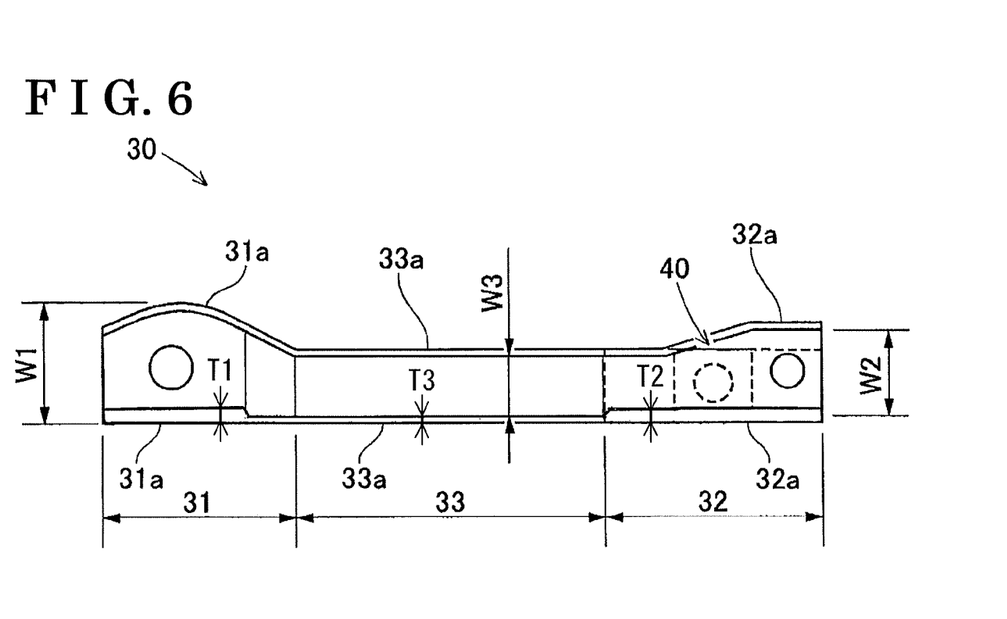
FIG. 6 is an upper view of the bracket of the seat apparatus according to the embodiment disclosed here, illustrating a thickness of the bracket in a lateral direction of the vehicle.

For example, as illustrated in FIG. 6, the bracket 30 may be configured so that a thickness T3 of the connecting portion 33 in the lateral direction is smaller than a thickness T1 of the front end portion 31 in the lateral direction and a thickness T2 of the rear end portion 32 in the lateral direction. In the seat apparatus 1 according to the embodiment, the bracket 30 supports the seat 10 including the occupant seated on the seat 10 or the baggage placed on the seat 10. Accordingly, the thicknesses T1, T2, and T3 of the bracket 30 in the lateral direction are set appropriately so that a predetermined strength may be obtained; therefore, the front end portion 31 and the rear end portion 32 have the flexural rigidities in the vertical direction which depend on the respective thicknesses T1 and T3. Thus, the flexural rigidity of the connecting portion 33 in the vertical direction may be set to be lower than the flexural rigidities of the front end portion 31 and the rear end portion 32 in the vertical direction by the aforementioned configuration of the bracket 30.

Moreover, according to the seat apparatus 1 of the embodiment, the bracket 30 is configured to include the front end portion 31 serving as the first end portion fixed to the upper rail 22, and the rear end portion 32 serving as the second end portion. The load detection device 40 is supported between the rear end portion 32 (second end portion) of the bracket 30 and the upper rail 22. Alternatively, the bracket 30 may be configured to include the rear end portion 32 serving as the first end portion fixed to the upper rail 22 and the front end portion 31 serving as the second end portion. The load detection device 40 is supported between the front end portion 31 (second end portion) of the bracket 30 and the upper rail 22. Thus, a seat apparatus in which the load detection device 40 is arranged at one of the front and rear end portions of the upper rail 22 serving as the slide rail may function similarly to the function of the seat apparatus 1 according to the embodiment.

As described above, according to the aforementioned embodiment, the seat apparatus 1 includes the upper rail 22 arranged slidably relative to the floor 2 in the longitudinal direction, the bracket 30 including the front end portion 31 fixed to the upper rail 22, the rear end portion 32, and the connecting portion 33 connecting the front end portion 31 to the rear end portion 32, the seat 10 supported by the bracket 30, and the load detection device 40 arranged between the upper rail 22 and the rear end portion 32 of the bracket 30 and detecting the load applied to the seat 10. The flexural rigidity of the connecting portion 33 of the bracket 30 in the vertical direction of the vehicle is set to be lower than the flexural rigidities of the front end portion 31 and the rear end portion 32 of the bracket 30 in the vertical direction.

For example, in the seat apparatus 1 of the embodiment including the load detection device 40 arranged between the upper rail 22 and the rear end portion 32 of the bracket 30 in the vertical direction, the load due to the deformation of the upper rail 22 or the frame 14 that constitutes a portion of the seat 10 may be applied to the attachment portion of the front or rear end portion of the upper rail 22 and the bracket 30 that supports the seat 10. The deformation due to the deformation of the upper rail 22 or the frame 14 acts in the direction to detach the bracket 30 from the upper rail 22 or in the direction to press the bracket 30 against the upper rail 22, i.e., the load due to the deformation the upper rail 22 or the frame 14 acts in the vertical direction. As described above, the bracket 30 of the seat apparatus 1 is configured so that the flexural rigidity of the connecting portion 33 connecting the front end portion 31 to the second end portion 32 is lower than the flexural rigidities of the front end portion 31 and the rear end portion 32; therefore, the connecting portion 33 is deformed so as to allow the deformation of the upper rail 22 or the frame 14. Accordingly, the load due to the deformation of the upper rail 22 or the like is refrained from being transmitted to the load detection device 40 arranged between the upper rail 22 and the rear end portion 32 of the bracket 30. Consequently, even when the upper rail 22 or the like is deformed, the load due to the deformation of the upper rail 22 or the like is refrained from acting on the load detection device 40 and the load detection device 40 may further accurately detect the load applied to the seat 10.

According to the aforementioned embodiment, when the upper rail 22 is deformed relative to the bracket 30, the connecting portion 33 is elastically deformed to restrain the load due to the deformation of the upper rail 22 from acting on the load detection device 40.

For example, the upper rail 22 is deformed relative to the front end portion 31 of the bracket 30 depending on the variations of the magnitude or direction of the load applied to the seat 10 and depending on the adjusted position of the seat 10. At this time, the bracket 30 supporting the seat 10 and including the connecting portion 33 having the flexural rigidity lower than the flexural rigidities of the front end portion 31 and the rear end portion 32, is elastically deformed, thereby allowing the deformation of the upper rail 22 relative to the bracket 30. Accordingly, the load detection device 40 may further accurately detect the load applied to the seat 10.

According to the aforementioned embodiment, the bracket 30 includes the first, second, and third flanges 31a, 32a, and 33a formed at the front end portion 31, the rear end portion 32, and the connecting portion 33, respectively. The first, second, and third flanges 31a, 32a, and 33a are arranged at the peripheral side edge in the lateral direction of the vehicle while extending at least upward and downward from the peripheral side edge. The height H3 of the third flange 33a in the vertical direction is set to be shorter than the height H1 of the first flange 31a and the height H2 of the second flange 32a.

Accordingly, the flexure rigidity of the connecting portion 33 in the vertical direction may be easily set to be lower than the flexure rigidities of the front end portion 31 and the rear end portion 32.

According to the aforementioned embodiment, the bracket 30 is configured so that the width W3 of the connecting portion 33 in the lateral direction of the vehicle is smaller than the widths W1 and W2 of the front end portion 31 and the rear end portion 32, respectively, in the lateral direction.

Accordingly, the flexure rigidity of the connecting portion 33 in the vertical direction may be easily set to be lower than the flexure rigidities of the front end portion 31 and the rear end portion 32.

According to the aforementioned embodiment, the bracket 30 is configured so that the thickness T3 of the connecting portion 33 in the lateral direction of the vehicle is smaller than the thicknesses T1 and T2 of the front end portion 31 and the rear end portion 32, respectively, in the lateral direction.

Accordingly, the flexure rigidity of the connecting portion 33 in the vertical direction may be easily set to be lower than the flexure rigidities of the front end portion 31 and the rear end portion 32.

According to the aforementioned embodiment, the seat apparatus 1 further includes the lift mechanism 50 arranged between the seat 10 and the bracket 30 in the vertical direction and moving the seat 10 upward and downward relative to the floor 2.

In the seat apparatus 1 configured as described above, the occupant seated on the seat 10 or the baggage placed on the seat 10 is moved upward and downward by the operation of the lift mechanism 50. Accordingly, the magnitude or direction of the load applied to the seat 10 tends to vary. In particular, in the conventional seat apparatus, the amount of deformation of the upper rail 22 or the seat frame 14 that constitutes a portion of the seat 10 varies and the load acting on the load detection device 40 via the bracket 30 also varies.

Accordingly, in a case where the position of the seat 10 in the vertical direction is adjusted by the operation of the lift mechanism 50, the load due to the deformation of the upper rail 22 or the like is refrained from acting on the detection value of the load detection device 40 by the bracket 30 configured as described above. As a result, the load detection device 40 may further accurately detect the load applied to the seat 10. Thus, the bracket 30 in which the flexural rigidity of the connecting portion 33 is set to be low is applied to the seat apparatus 1 provided with the lift mechanism 50; therefore, the detection accuracy of the load detection device 40 is effectively increased.

According to the aforementioned embodiment, the seat apparatus 1 includes the upper rail 22 including the pair of upper rails 22 adapted to be arranged on the floor 2 and keeping the predetermined distance from each other in the lateral direction of the vehicle, and the bracket 30 including the pair of brackets 30 adapted to be fixed to the pair of slide rails 22. The load detection device 40 is arranged between each of the pair of upper rails 22 and the rear end portion 32 of each of the pair of brackets 30. The rear end portion 32 is positioned rearward relative to the front end portion 31 in the longitudinal direction.

Thus, the load detection devices 40 are arranged at the respective rear end portions of the pair of the upper rails 22 in the lateral direction, thereby further reducing the manufacturing, assembling, and wiring costs compared to a case where the load detection devices 40 are arranged at the attachment portions of the respective front and rear end portions of the pair of upper rails 22. On the other hand, in a case where the load detection devices 40 are arranged at the respective rear end portions of the pair of upper rails 22, the information detected by the load detection devices 40 may be less compared to a case where the load detection devices 40 are arranged at the attachment portions of the respective front and rear end portions of the pair of upper rails 22.

Accordingly, in the seat apparatus 1 where the load detection devices 40 are arranged at the respective rear end portions of the pair of upper rails 22, the errors included in the sum total of the detection values of the load detection devices 40 due to the deformation of the upper rail 22 or the like are expected to be reduced. Furthermore, in a case where the occupant is seated on the seat 10, the center of gravity of the occupant is positioned further rearward than the intermediate position of the seat 10 in the longitudinal direction. Accordingly, the load of the seat 10 including the load of the occupant is mainly applied to the rear end portion 32 of the bracket 30 supporting the seat 10. That is, the load acting in the direction to detach the bracket 30 from the upper rail 22 is applied to the front end portion 31 of the bracket 30 and the load acting in the direction to press the bracket 30 against the upper rail 22 is applied to the rear end portion of the bracket 30. Consequently, the bracket 30 configured as described above is applied to the seat apparatus 1 and each load detection device 40 is arranged between the upper rail 22 and the rear end portion of the upper rail 22. As a result, the load due to the deformation of the upper rail 22 or the like is refrained from being transferred to the load detection device 40. Thus, the load due to the deformation of the upper rail 22 or the like is refrained from acting on the load detection device 40 and the load detection device 40 may further accurately detect the load applied to the seat 10.

According to the aforementioned embodiment, the bracket 30 includes the first, second, and third flanges 31a, 32a, and 33a formed at the front end portion 31, the rear end portion 32, and the connecting portion 33, respectively. The first, second, and third flanges 31a, 32a, and 33a are arranged at the peripheral side edge in the lateral direction of the vehicle while extending at least upward and downward from the peripheral side edge. The height H1 of the first flange 31a is set to be longer than the height H2 of the second flange 32.

According to the aforementioned embodiment, the width W1 of the front end portion 31 in the lateral direction of the vehicle is larger than the width W2 of the rear end portion 32 in the lateral direction.

According to the aforementioned embodiment, the bracket 30 is configured so that one of the side surfaces in the lateral direction includes the flat surface.

According to the aforementioned embodiment, the bracket 30 is designed to have the front end portion 31, the rear end portion 32, and the connecting portion 33 that are formed in the uniform thickness.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A seat apparatus for a vehicle, comprising:
a slide rail arranged slidably relative to a vehicle floor in a longitudinal direction;
a bracket including a first end portion fixed to the slide rail, a second end portion, and a connecting portion connecting the first end portion to the second end portion;
a vehicle seat supported by the bracket; and
a load detection device arranged between the slide rail and the second end portion of the bracket and detecting a load applied to the vehicle seat,
wherein flexural rigidity of the connecting portion of the bracket in a vertical direction of the vehicle is set to be lower than flexural rigidities of the first end portion and the second end portion of the bracket in the vertical direction, and
wherein the first end portion is directly fixed to the slide rail by a fixing member.

2. The seat apparatus according to claim 1, wherein when the slide rail is deformed relative to the bracket, the connecting portion is elastically deformed to restrain a load due to the deformation of the slide rail from acting on the load detection device.

3. The seat apparatus according to claim 1, wherein the bracket includes first, second, and third flanges formed at the first end portion, the second end portion, and the connecting portion, respectively, the first, second, and third flanges being arranged at a peripheral side edge in a lateral direction of the vehicle and extending at least upward and downward from the peripheral side edge, and a length of the third flange in the vertical direction is set to be shorter than lengths of the first flange and the second flange.

4. The seat apparatus according to claim 1, wherein the bracket is configured so that a width of the connecting portion in a lateral direction of the vehicle is smaller than widths of the first end portion and the second end portion, respectively, in the lateral direction.

5. The seat apparatus according to claim 1, wherein the bracket is configured so that a thickness of the connecting portion in a lateral direction of the vehicle is smaller than thicknesses of the first end portion and the second end portion, respectively, in the lateral direction.

6. The seat apparatus according to claim 1, further comprising a lift mechanism arranged between the vehicle seat and the bracket in the vertical direction and moving the vehicle seat upward and downward relative to the vehicle floor.

7. The seat apparatus according to claim 1, comprising:
the slide rail including a pair of slide rails adapted to be arranged on the vehicle floor and keeping a predetermined distance from each other in a lateral direction of the vehicle; and
the bracket including a pair of brackets adapted to be fixed to the pair of slide rails, wherein the load detection device is arranged between each of the pair of slide rails and the second end portion of each of the pair of brackets, the second end portion being positioned rearward relative to the first end portion in the longitudinal direction.

8. The seat apparatus according to claim 1, wherein the bracket includes first, second, and third flanges formed at the first end portion, the second end portion, and the connecting portion, respectively, the first, second, and third flanges being arranged at a peripheral side edge in a lateral direction of the vehicle and extending at least upward and downward from the peripheral side edge, and a length of the first flange in the vertical direction is set to be longer than a length of the second flange in the vertical direction.

9. The seat apparatus according to claim 3, wherein the bracket is configured so that the length of the first flange of the first end portion in the vertical direction is longer than the length of the second flange of the second end portion in the vertical direction.

10. The seat apparatus according to claim 1, wherein the bracket is configured so that a width of the first end portion in a lateral direction of the vehicle is larger than a width of the second end portion in the lateral direction.

11. The seat apparatus according to claim 4, wherein the bracket is configured so that the width of the first end portion in the lateral direction is larger than the width of the second end portion.

12. The seat apparatus according to claim 4, wherein the bracket is configured so that one of side surfaces in the lateral direction includes a flat surface.

13. The seat apparatus according to claim 10, wherein the bracket is configured so that one of side surfaces in the lateral direction includes a flat surface.

14. The seat apparatus according to claim 11, wherein the bracket is configured so that one of side surfaces in the lateral direction includes a flat surface.

15. The seat apparatus according to claim 1, wherein the bracket is designed to have the first end portion, the second end portion, and the connecting portion that are formed in a uniform thickness.

16. A seat apparatus for a vehicle, comprising:
a slide rail arranged slidably relative to a vehicle floor in a longitudinal direction;
a bracket including a first end portion fixed to the slide rail, a second end portion, and a connecting portion connecting the first end portion to the second end portion;
a vehicle seat supported by the bracket; and
a load detection device arranged between the slide rail and the second end portion of the bracket and detecting a load applied to the vehicle seat,
wherein flexural rigidity of the connecting portion of the bracket in a vertical direction of the vehicle is set to be lower than flexural rigidities of the first end portion and the second end portion of the bracket in the vertical direction, and
wherein a load detection device is not arranged between the slide rail and the first end portion of the bracket.

17. A seat apparatus for a vehicle, comprising:
a slide rail arranged slidably relative to a vehicle floor in a longitudinal direction;
a bracket including a first end portion fixed to the slide rail, a second end portion, and a connecting portion connecting the first end portion to the second end portion;
a vehicle seat supported by the bracket; and
a load detection device arranged between the slide rail and the second end portion of the bracket and detecting a load applied to the vehicle seat,
wherein flexural rigidity of the connecting portion of the bracket in a vertical direction of the vehicle is set to be lower than flexural rigidities of the first end portion and the second end portion of the bracket in the vertical direction,
wherein the first end portion is directly fixed to the slide rail by a fixing member, and
wherein a load detection device is not arranged between the slide rail and the first end portion of the bracket.

* * * * *